Jan. 13, 1925. 1,522,587

C. A. HALLSTROM

TOOL HOLDER

Filed Feb. 25, 1924  2 Sheets-Sheet 1

Inventor
Charles A. Hallstrom
By Attorneys
Southgate & Southgate

Jan. 13, 1925.

1,522,587

C. A. HALLSTROM

TOOL HOLDER

Filed Feb. 25, 1924   2 Sheets-Sheet 2

Inventor
Charles A. Hallstrom
By Attorneys
Southgate & Southgate

Patented Jan. 13, 1925.

1,522,587

UNITED STATES PATENT OFFICE.

CHARLES A. HALLSTROM, OF WORCESTER, MASSACHUSETTS.

TOOL HOLDER.

Application filed February 25, 1924. Serial No. 694,935.

*To all whom it may concern:*

Be it known that I, CHARLES A. HALLSTROM, a citizen of the United States, residing at Worcester, in the county of Worcester and State of Massachusetts, have invented a new and useful Tool Holder, of which the following is a specification.

This invention relates to a tool holder suitable for application to lathes, planers, shaping machines and various other machine tools.

The principal objects of the invention are to provide a tool holder that can be made in such a way as to position the cutting tool horizontally if the tool is a horizontal tool and avoid the angle or rake common in tools of this class, and especially to provide a tool with a bushing adapting it for use with square or round shanked tools and tools of different sizes so that it will be almost universal in its application; and to provide the bushing in such form that the tightening screw will not only hold the bushing in when the tool is held depending vertically, but will clamp the tool and bushing at the same time.

Another object of the invention is to provide a smaller tool shank with a bushing to be inserted in the above mentioned bushing and adapted to be clamped by the single screw.

The invention is adapted to be used on lathes for turning, centering, facing, screw cutting and for every purpose for which lathe tools are now used. It is adapted to be used for boring and on shapers and planers. In the latter two cases the tool holder hangs down from a tool head and the bushing is held in place by the tightening screw even when the tool is not in place.

Reference is to be had to the accompanying drawings, in which—

Figure 1:
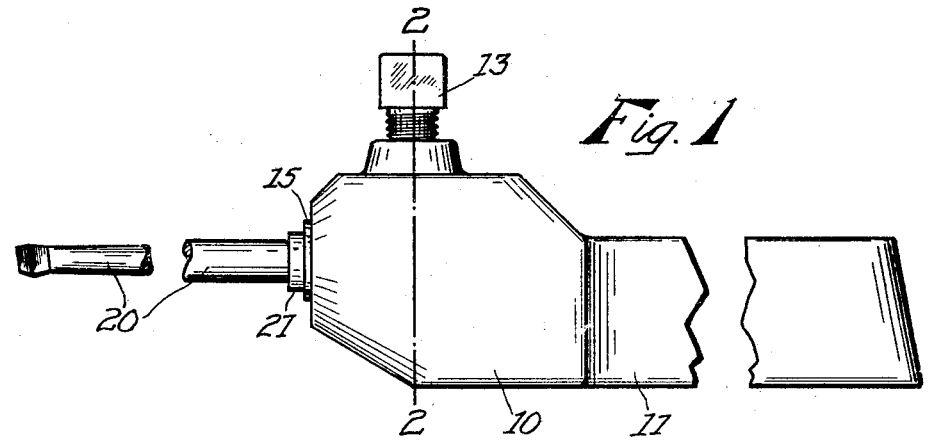
Fig. 1 is a side view of a preferred embodiment of this invention showing it as holding a small tool with an extra bushing, as described above.

The tool holder is provided with a body 10 and a rearwardly extending shank 11 for attachment to a lathe, planer, shaping machine or any other machine tool. The body 10 is provided with a recess 12 extending in from the front end. This recess is horizontal, that is, parallel with the top and bottom edges of the shank 11 and is of cylindrical form. For this reason, a tool held in this bushing, if properly positioned therein, will have its shank parallel with the gripping surfaces of the tool support of the machine. The upper part of the head 10 is provided with a screw threaded perforation for a binding screw 13 which extends centrally into the recess 12.

For most purposes I provide the cylindrical recess with a bushing 15. This has a cylindrical outer surface exactly fitting the recess 12 and is provided with a central perforation 16 for receiving the end of the screw 13 and allowing its inner end to engage anything that is held within the bushing. This bushing is provided with what amounts to a cylindrical passage 17 and a square passage 18 inside. That is, the cylindrical passage may be considered as cut out at four corners 18 to provide the equivalent of a square passage through the center of the bushing. This passage is provided for the purpose of permitting of securing either cylindrical or square shanked tools in the bushing.

Figure 2:
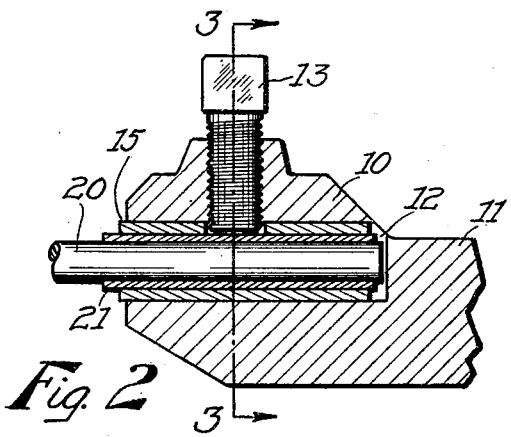
Fig. 2 is a longitudinal central view of the same on the line 2—2 of Fig. 3.
Figure 3:
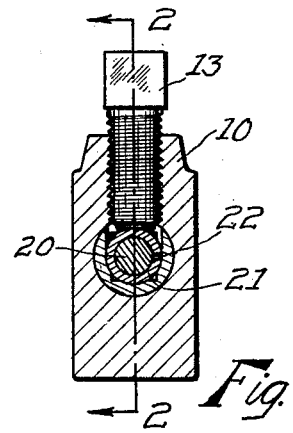
Fig. 3 is a transverse sectional view on the line 3—3 of Fig. 2.

In the use of the invention, for a small boring tool or any tool, I arrange it as shown in Figs. 1, 2 and 3. This tool 20 has a cylindrical shank in this case and I provide this shank with an inner bushing 21 consisting simply of a piece of metal bent up to cylindrical shape and slotted cylindrically at 22 so that it can be forced to grip the shank of the tool. This bushing 21 fits in the cylindrical recess 17 as shown. When this bushing is put in place with the tool shank in position the screw 13 is tightened up and it comes down through the perforation 16 on the surface of the bushing 21 and clamps that bushing firmly to the tool. In boring with the tool 20 it is fed directly in and as the feed is horizontal and the shank is also horizontal there is no obstruction to the feed.

Figure 5:
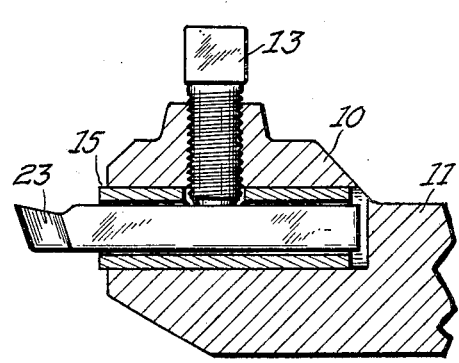
Fig. 5 is a view similar to Fig. 2 showing the invention as used for a square shanked turning tool.
Figure 4:
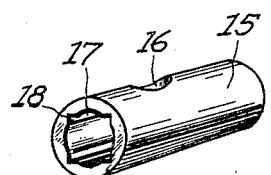
Fig. 4 is a perspective view of the bushing.

In Fig. 5 I have shown an ordinary turning tool 23 having a square shank held in the square passage 18. This turning tool is like an ordinary turning tool except that on account of the fact that it is located horizontally, the surface has to be modified slightly from the ordinary tool which is held at an inclination.

Figure 6:
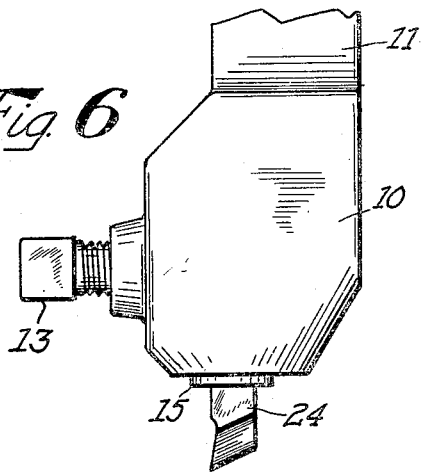
Fig. 6 is a view showing the holder used on a planer or shaping machine with a square shanked tool in position.

In Fig. 6 a planing tool 24 is shown held in the same tool holder in the same way as the tool 23 but the tool holder is supported from above in vertical position on a planer. In this way the downward feed, if that is used, will be direct and straight in line with the tool.

Figure 7:
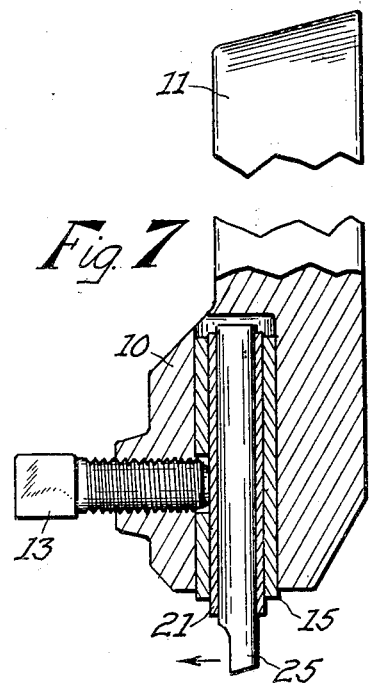
Fig. 7 is a sectional view of the same but showing a slotting tool in position.

In Fig. 7 I have shown the tool holder in position to be mounted on a shaping machine with the bushing 15 carrying an inner bushing, as for example, the bushing 21 and a tool 25 for slotting purposes. This tool is semi-cylindrical in shape at its cutting end. The method of use is to bore two holes at the right distance apart the size of the slot and then to cut from one hole to the other in the direction of the arrow with this tool.

Figure 8:
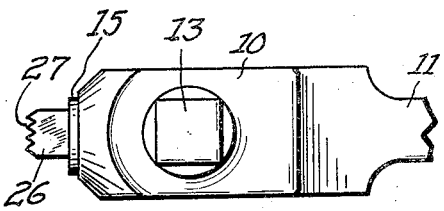
Fig. 8 is a plan showing a thread cutting tool in the holder.

In Fig. 8 a tool 26 is shown having V-shaped cutting surfaces 27 for cutting screw threads. These are sharpened so that each tooth cuts all the time. That is, the first one takes a roughing cut and the last one the finishing cut.

Figure 9:
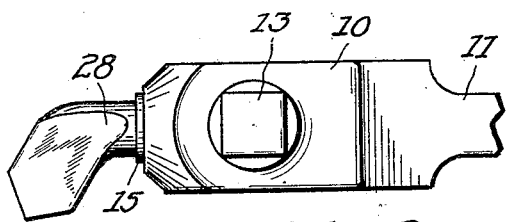
Fig. 9 is a plan showing an offset tool held in the holder.

In Fig. 9 I have shown another tool 28 of well known type held by the same tool holder.

Figure 10:
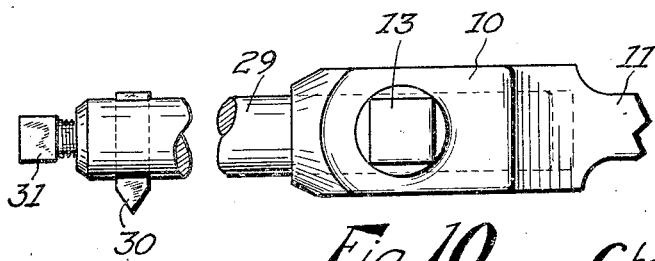
Fig. 10 is a similar view showing the use of the invention for a large shanked boring tool.

In Fig. 10 I have shown the use of this tool holder without the bushing 15. Here the shank 29 of the tool is of the size of the bore of the recess 12 and it fills it. The tool 30 is the only part that is made of tool steel and the only part that has to be taken out and sharpened. It is held in the rod or shank 29 by a screw 31. The shanks or rods of these tools are made of square or round stock of whatever size may be desired.

I have not attempted to show all the uses of this tool holder but I have shown enough to illustrate the fact that it is capable of wide use and that it is extremely convenient for the purposes indicated. The operator does not have to hunt around for a different tool holder for every different kind of tool he uses but he can employ this one for almost every kind. It is equally useful on lathes, planers and shapers and can be used for turning, boring, screw threading, facing and various other kinds of metal working operations as well as all kinds of planing and shaping.

Although I have illustrated and described only a single form of the tool holder itself and only a few of its applications, I am aware of the fact that its range of application in machine shop practice is very wide and that changes may be made in the details of construction without departing from the scope of the invention as expressed in the claims. Therefore I do not wish to be limited to all the details of construction herein shown and described, but what I do claim is:—

1. As an article of manufacture, a tool holder having a shank provided with substantially parallel opposite surfaces, said tool holder having a head provided with a cylindrical recess opening in from the end opposite the shank and having its axis parallel with said surfaces, a screw on the head for holding a tool in the recess, and a bushing fitting in said recess, said bushing having a perforation through it for receiving said screw and also having a passage through it suitable for exactly fitting either a square or a round shank of a tool.

2. The combination with a tool holder having a recess therein, of a bushing fitting in said recess and having a longitudinal passage through it having a cylindrical surface, a split bushing fitting in the cylindrical surface, a tool having a cylindrical shank located within the inner bushing, and means for clamping the inner bushing on the tool of said shank through the outer bushing and holding them in rigid position.

3. The combination with a tool holder having a cylindrical recess therein, of a bushing fitting in said recess and having a longitudinal passage through it having a cylindrical surface, a split bushing fitting in the cylindrical surface, a tool having a cylindrical shank located within the inner bushing, and means for clamping the inner bushing on the tool of said shank and holding them in rigid position, the passage in said bushing also having projecting angles to permit it to receive the polygonal shank of a tool.

4. As an article of manufacture, a tool holder having a shank by which it can be gripped on a machine tool and provided with a recess parallel with said shank, whereby when the shank is held in vertical position a tool held in said recess will also be vertical, a bushing in said recess for receiving a tool shank and having an opening therethrough, and a screw on the head of the tool holder for entering the opening and clamping a tool in the bushing so that the bushing will be held in the vertical recess by the screw.

In testimony whereof I have hereunto affixed my signature.

CHARLES A. HALLSTROM.